US009596684B2

(12) United States Patent
Lin

(10) Patent No.: US 9,596,684 B2
(45) Date of Patent: Mar. 14, 2017

(54) METHOD AND APPARATUS FOR ALLOCATING RESOURCES FOR GROUP CALL IN CLUSTER SYSTEM

(71) Applicant: ZTE CORPORATION, Guangdong (CN)

(72) Inventor: Yan Lin, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/426,266

(22) PCT Filed: Jul. 23, 2013

(86) PCT No.: PCT/CN2013/079928
§ 371 (c)(1),
(2) Date: Mar. 5, 2015

(87) PCT Pub. No.: WO2013/178161
PCT Pub. Date: Dec. 5, 2013

(65) Prior Publication Data
US 2015/0257151 A1    Sep. 10, 2015

(30) Foreign Application Priority Data

Sep. 5, 2012 (CN) .......................... 2012 1 0324652

(51) Int. Cl.
*H04W 72/04* (2009.01)
*H04W 4/08* (2009.01)
(Continued)

(52) U.S. Cl.
CPC ......... *H04W 72/0453* (2013.01); *H04W 4/08* (2013.01); *H04W 72/005* (2013.01); *H04W 84/042* (2013.01)

(58) Field of Classification Search
CPC . H04W 4/08; H04W 72/005; H04W 72/0453; H04W 84/042
(Continued)

(56) References Cited

U.S. PATENT DOCUMENTS 8,990,305 B2 *  3/2015  Barkley .............. H04L 12/1827
                                                              370/260
9,306,993 B2 *  4/2016  Maeda .................. H04L 5/0007
(Continued)

FOREIGN PATENT DOCUMENTS

CN    101242293    8/2008
CN    101820585    9/2010
(Continued)

OTHER PUBLICATIONS

European Patent Office, Communication with extended European search report, in application No. 13796399.7, dated Jul. 27, 2015 (6 pages).
(Continued)

*Primary Examiner* — Chi H Pham
*Assistant Examiner* — Robert Lopata
(74) *Attorney, Agent, or Firm* — McAndrews, Held & Malloy, Ltd.

(57) ABSTRACT

In a method for allocating resources for a group call in a cluster system, when a group call is initiated, as cluster server counts the number of terminals under all MBSFN areas allocated and pre-allocated by each MCE for the group call, according to information about MBSFN areas allocated and pre-allocated by each MCE for the group call; when the group call is ongoing, re-counts the number of the terminals under all MBSFN areas allocated and pre-allocated by each MCE for the group call; upon determining that the number of the terminals under an MBSFN area changes from zero to non-zero, initiates a process of allocating resources for the
(Continued)

group call under the MBSFN area; and upon determining that the number of the terminals under an MBSFN area changes from non-zero to zero, initiates a process of releasing resources allocated for the group call under the MBSFN area.

20 Claims, 2 Drawing Sheets

(51) Int. Cl.
*H04W 72/00* (2009.01)
*H04W 84/04* (2009.01)

(58) Field of Classification Search
USPC .......................................................... 370/259
See application file for complete search history.

(56) References Cited

U.S. PATENT DOCUMENTS

| | | | |
|---|---|---|---|
| 2006/0063550 A1* | 3/2006 | Martin | H04L 12/1818 455/518 |
| 2008/0212519 A1* | 9/2008 | Fang | H04W 72/005 370/320 |
| 2010/0272004 A1* | 10/2010 | Maeda | H04L 5/0007 370/312 |
| 2012/0155364 A1* | 6/2012 | Kim | H04W 4/06 370/312 |
| 2012/0202493 A1* | 8/2012 | Wang | H04W 60/00 455/435.1 |
| 2013/0107784 A1* | 5/2013 | Chang | H04W 72/005 370/312 |
| 2013/0142072 A1* | 6/2013 | Xu | H04W 24/08 370/252 |
| 2013/0279375 A1* | 10/2013 | Newberg | H04W 88/16 370/260 |
| 2013/0286926 A1* | 10/2013 | Zhang | H04W 56/00 370/312 |
| 2014/0050083 A1* | 2/2014 | Layman | H04L 12/56 370/230 |
| 2014/0120973 A1* | 5/2014 | Agulnik | H04W 4/10 455/509 |
| 2014/0126452 A1* | 5/2014 | Agulnik | H04L 65/4061 370/312 |
| 2014/0192701 A1* | 7/2014 | Drevo | H04W 4/06 370/312 |
| 2015/0208379 A1* | 7/2015 | Lin | H04W 4/06 370/312 |

FOREIGN PATENT DOCUMENTS

| | | |
|---|---|---|
| CN | 101883327 | 11/2010 |
| WO | 2012079471 | 6/2012 |
| WO | 2012111735 | 8/2012 |

OTHER PUBLICATIONS

International Search Report for International Patent Application No. PCT/CN2013/079928, mailed Oct. 31, 2013.

\* cited by examiner

METHOD AND APPARATUS FOR ALLOCATING RESOURCES FOR GROUP CALL IN CLUSTER SYSTEM

CROSS-REFERENCE TO RELATED APPLICATIONS/INCORPORATION BY REFERENCE

This application is a 371 of International Patent Application No. PCT/CN2013/079928, filed Jul. 23, 2013, entitled "METHOD AND APPARATUS FOR ALLOCATING RESOURCES FOR GROUP CALL IN CLUSTER SYSTEM", which claims priority to Chinese Patent Application No. 201210324652.1, filed Sep. 5, 2012, entitled "METHOD AND DEVICE FOR ALLOCATING GROUP CALLING RESOURCES OF CLUSTER SYSTEM". The above-identified applications are hereby incorporated herein by reference in their entirety.

TECHNICAL FIELD

The disclosure relates to the field of communications technologies, and in particular, to a method and an apparatus for allocating resources for it group call in a cluster system.

BACKGROUND

The cluster communication service is a half-duplex bidirectional service which implements a one-to-many service, and has a feature that when the cluster server initiates a group call service, the voice information thereof can be sent simultaneously to each member of a predefined cluster group, and the service is established quickly.

In a fourth-generation mobile communication long term evolution (LTE) system, an enhanced multimedia broadcast multicast service (eMBMS) is introduced, which can be applied to the case where a terminal having a video function receives, via a physical multicast channel (PMCH), a digital audio/video service in the broadcast/multicast form.

The eMBMS service can be used, in consideration of the features thereof, for implementing the data transmission function of the cluster group call listening terminals (which can also be referred to as the users). Specifically, a sending and receiving process of the eMBMS service is used as a data sending and receiving process of the group call listening terminal. In the procedure, a temporary mobile group identity (TMGI) may be used as the cluster group identity. The user equipment (UE) acquires the TMGI of the current group to which the UE belongs according to the group information update procedure. In the eMBMS procedure, it is judged, mainly according to the TMGI, whether the group is the group to which the UE belongs.

In the current eMBMS techniques, the multicast broadcast single frequency network (MBSFN) areas are mostly static configured and can be modified via operation and maintenance (O&M), and the range thereof includes a group of cells. In the same MBSFN area, the PMCH configurations are completely the same, and when the terminal is moving in the MBSFN area, it can be ensured via the synchronization (sync) protocol that the data acquired are also continuous. If the MBSFN area is deployed to be large enough, the probability of the resource redistribution of the eMBMS service is reduced when the terminal moves into the target cell, thereby reducing the service interruptions. However, if the MBSFN area is deployed to be too large, the resource waste is caused, since there may be no terminal needing to receive the eMBMS service/group call under some cells.

It can be seen therefrom, since the terminals may be under different MBSFN areas, when the eMBMS service/group call is initiated, the cluster server does not know under which MBSFN areas the terminals needing to receive the eMBMS service/group call are located, and thus, it cannot be determined accurately to which MBSFN areas the resources need to be distributed. If the method of distributing resources fixedly under some MBSFN areas is used for some eMBMS services/group calls, since it is possible that the terminals are not in these MBSFN areas, this will not only cause the resource waste, but also render not being able to receive the eMBMS service/group call in time, so that the eMBMS service/group call has a bad real-time performance. At present, there is still no appropriate resource distribution method.

SUMMARY

Embodiments of the disclosure provide a method and an apparatus for allocating resources for a group call in a cluster system to solve the problem of wasting resources due to the fixed configurations of the MBSFN areas receiving a group call in the related art.

On the basis of the above-mentioned problem, an embodiment of the disclosure provides a method for allocating resources for a group call in a cluster system, including: when the group call is initiated, a cluster server counting the number of terminals under all multicast broadcast single frequency network (MBSFN) areas allocated and pre-allocated for the group call by each multi-cell/multicast coordination entity (MCE), according to information about the MBSFN areas allocated and pre-allocated by each MCE for the group call; when the group call is ongoing, when a terminal delays to access the group call, a terminal in a group call listening state exits from the group call, or a terminal in the group call listening state is moving under different MBSFN areas, the cluster server re-counting the number of terminals under all the MBSFN areas allocated and pre-allocated by each MCE for the group call; and as regards each MBSFN area, if it is determined that the number of terminals under the MBSFN area changes from zero to non-zero, the cluster server initiating a process of allocating resources for the group call under the MBSFN area; and if it is determined that the number of terminals under the MBSFN area changes from non-zero to zero, the cluster server initiating a process of releasing resources allocated for the group call under the MBSFN area.

In an example embodiment, the cluster server obtains the information about the MBSFN areas allocated and pre-allocated by each MCE for the group call in the following manner: the cluster server initiating the group call to each terminal in a group via a mobility management entity (MME); the cluster server judging a state of the each terminal via the MME; as regards each terminal, if it is judged that the terminal is in an idle state, the cluster server sending a paging message to evolved NodeBs (eNBs) in a tracking area list of the terminal via the MME, and notifying an eNB to which the terminal belongs to upload identifier (ID) information and a temporary mobile group identity (TMGI) of the terminal accessing the group call, and information about an MBSFN area allocated or pre-allocated by the MCE for the group call; and if it is judged that the terminal is in a connection state, the cluster server sending a dedicated control channel (DCCH) message to the eNB to which the terminal belongs via the MME, and notifying the eNB to upload the ID information and the TMGI of the terminal accessing the group call, and the information about an MBSFN area allocated or pre-allocated by the MCE for the group call.

In an example embodiment, the cluster server re-counts, when the terminal delays to access the group call, the number of terminals under all the MBSFN areas allocated and pre-allocated by each MCE for the group call in the following manner: when the cluster server receives information about an MBSFN areas allocated or pre-allocated for the group call by the MCE, which is forwarded by an eNB to which the terminal delaying to access the group call belongs, increasing the number of terminals under the MBSFN area by one.

In an example embodiment, the cluster server re-counts, when the terminal in the group call listening state exits from the group call, the number of the terminals under all the MBSFN areas allocated and pre-allocated by each MCE for the group call in the following manner: when the cluster server receives information about an MBSFN area allocated for the group call by the MCE, which is forwarded by an eNB to which the terminal exiting from the group call belongs, decreasing the number of terminals under the MBSFN area by one.

In an example embodiment, the cluster server re-counts, when the terminal in the group call listening state is moving under different MBSFN areas, the number of terminals under all the MBSFN areas allocated and pre-allocated by each MCE for the group call in the following manner: when the cluster server receives information about an MBSFN area allocated or pre-allocated for the group call by the MCE to which a target eNB belongs, which is forwarded by the target eNB of the terminal moving in different MBSFN areas, increasing the number of terminals under the MBSFN area by one, and decreasing the number of terminals under an MBSFN area allocated for the group call by the MCE to which a source eNB of the terminal belongs by one.

In an example embodiment, the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

Another embodiment of the disclosure provides an apparatus for allocating resources for a group call in a cluster system, the apparatus including: a counting module which is configured to count, when a group call is initiated, the number of terminals under all multicast broadcast single frequency network (MBSFN) areas allocated and pre-allocated by each multi-cell/multicast coordination entity (MCE) for the group call, according to information about the MBSFN areas allocated and pre-allocated by each MCE for the group call; and to re-count, when the group call is ongoing, when a terminal delays to access the group call, a terminal in a group call listening state exits from the group call, or a terminal in the group call listening state is moving under different MBSFN areas, the number of the terminals under all the MBSFN areas allocated and pre-allocated by each MCE for the group call; and an initiating module which is configured to initiate, for each MBSFN area for which counting is performed by the counting module, if it is determined that the number of the terminals under the MBSFN area changes from zero to non-zero, a process of allocating resources for the group call under the MBSFN area; and to initiate, if it is determined that the number of the terminals under the MBSFN area changes from non-zero to zero, a process of releasing resources allocated for the group call under the MBSFN area.

In an example embodiment, the counting module is configured to initiate the group call to each terminal in the group via the mobility management entity (MME); to judge a state of the each terminal via the MME, wherein as regards each terminal, if it is judged that the terminal is in an idle state, then the counting module sends a paging message to eNBs in the tracking area list of the terminal via the MME and notifies an eNB to which the terminal belongs to upload identifier (ID) information and a temporary mobile group identity (TMGI) of the terminal accessing the group call, and information about an MBSFN area allocated or pre-allocated by the MCE for the group call; and if it is judged that the terminal is in a connection state, the counting module sends a dedicated control channel (DCCH) message to the eNB to which the terminal belongs via the MME, and notifies the eNB to upload the ID information and the TMGI of the terminal accessing the group call, and the information about an MBSFN area allocated or pre-allocated by the MCE for the group call.

In an example embodiment, the counting module is configured to increase the number of terminals under the MBSFN area by one when receiving information about an MBSFN area allocated or pre-allocated for the group call by the MCE, which is forwarded by an eNB to which the terminal delaying to access the group call belongs.

In an example embodiment, the counting module is configured to decrease the number of terminals under the MBSFN area by one, when receiving information about an MBSFN area allocated for the group call by the MCE, which is forwarded by an eNB to which the terminal exiting from the group call belongs.

In an example embodiment, the counting module is configured to increase the number of terminals under the MBSFN area by one, when the cluster server receives information about an MBSFN area allocated or pre-allocated for the group call by the MCE to which a target eNB belongs, which is forwarded by the target eNB of the terminal moving in different MBSFN areas; and decrease the number of terminals under an MBSFN area allocated for the group call by the MCE to which a source eNB of the terminal belongs by one.

In an example embodiment, the initiating module is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

The embodiments of the disclosure have the following beneficial effects.

The embodiments of the disclosure provide a method and an apparatus for allocating resources for a group call in a cluster system. During the implementation of the method, a cluster server counts the number of terminals under the MBSFN areas allocated by each MCE for the group call when the group call is initiated; and during the subsequent group call processing, when a terminal delays to access the group call, a terminal in a group call listening state exits from the group call, or as terminal in a group call listening state moves under different MBSFN areas, the cluster server re-counts again the number of the terminals under all the MBSFN areas allocated and pre-allocated by each MCE for the group call; if it is determined that the number of the terminals under a certain MBSFN area changes from zero to non-zero, a process of allocating resources for the group call under the MBSFN area is initiated at this moment; and if it is determined that the number of the terminals under an MBSFN area changes from non-zero to zero, a process of releasing resources allocated for the group call under the MBSFN area is initiated at this moment. The embodiments of the disclosure allocate resources to the group call according to the number of the terminals receiving the group call under each MBSFN area, so as to implement update and maintenance in real time and avoid the problem of wasting resources due to the fixed configurations of the MBSFN areas receiving a group call in the related art.

DETAILED DESCRIPTION OF THE EMBODIMENTS

The particular embodiments of the method and apparatus for allocating resources for a group call in a cluster system provided by the embodiment of the disclosure are described below in combination with the accompanying drawings.

Figure 1:
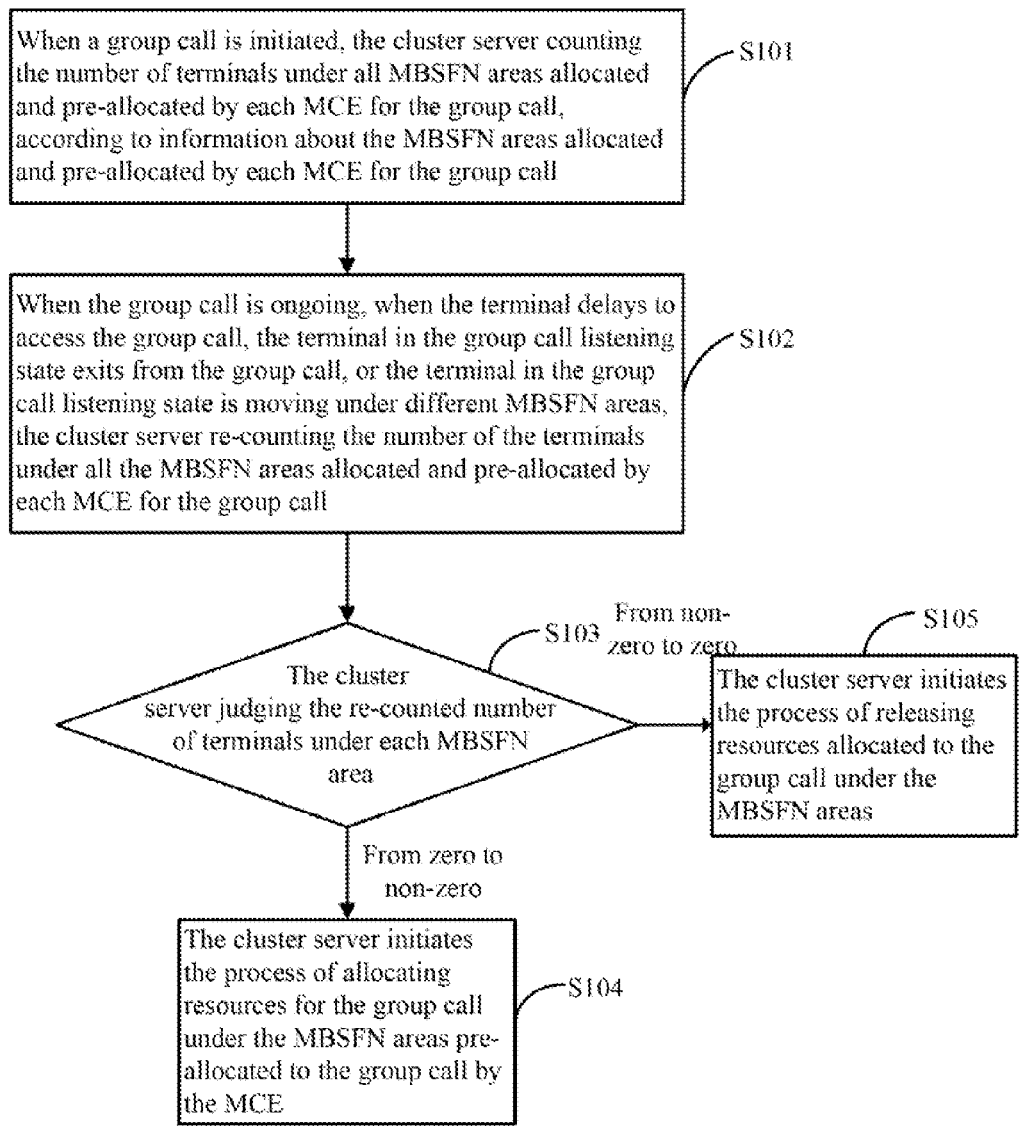
FIG. 1 is a flowchart of a method for allocating resources for a group call in a cluster system provided by an embodiment of the disclosure.

An embodiment of the disclosure provides a method for allocating resources for a group call in a cluster system; as shown in FIG. 1, the method particularly includes the steps of:

S101: when a group call is initiated, a cluster server counts the number of terminals under all MBSFN areas allocated and pre-allocated by each MCE for the group call, according to information about the MBSFN areas allocated and pre-allocated by each MCE for the group call;

S102: when the group call is ongoing, when a terminal delays to access the group call, a terminal in a group call listening state exits from the group call, or a terminal in the group call listening state is moving under different MBSFN areas, the cluster server re-counts the number of the terminals under all the MBSFN areas allocated and pre-allocated by each MCE for the group call;

S103: for each MBSFN area, the cluster server judges the re-counted number of the terminals under each MBSFN area, if it is determined that the number of the terminals under the MBSFN area changes from zero to non-zero, step S104 is executed, and if it is determined, that the number of the terminals under the MBSFN area changes from non-zero to zero, step S105 is executed;

S104: the cluster server initiates a process of allocating resources for the group call under the MBSFN area pre-allocated to the group call by the MCE; and S105: the cluster server initiates a process of releasing resources under the MBSFN area.

Figure 2:
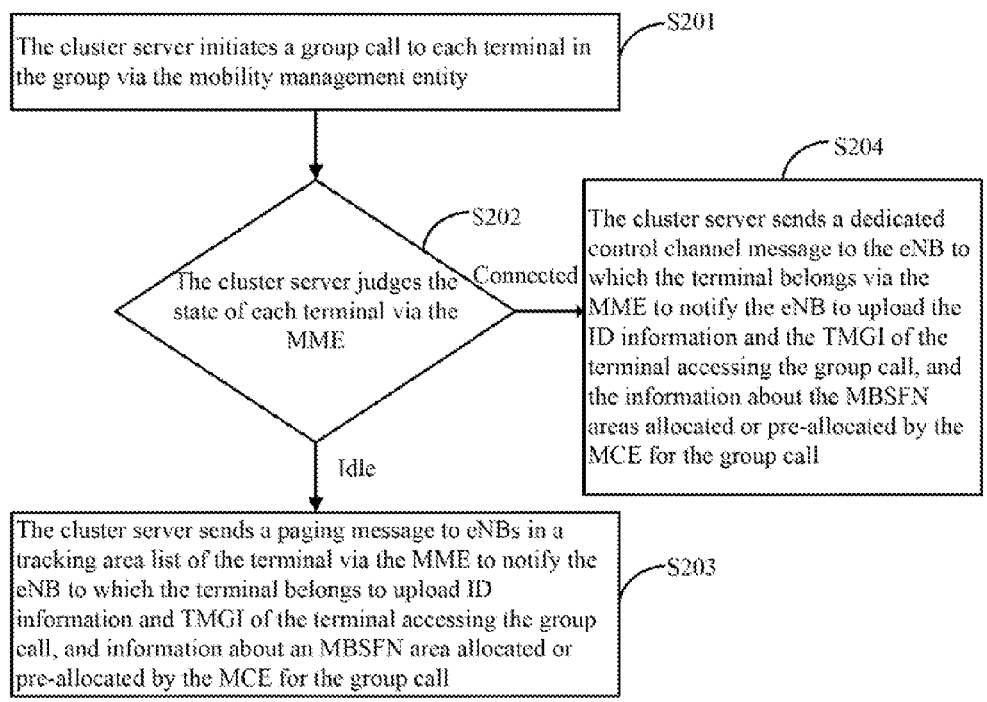
FIG. 2 is a flow chart of a cluster server counting the number of terminals under each MBSFN area corresponding to the group call provided by an embodiment of the disclosure.

In an example embodiment, as shown in FIG. 2, the cluster server in the above-mentioned step S101 may obtain information about the MBSFN areas allocated and pre-allocated by each MCE for the group call via the following processes:

S201: the cluster server initiates a group call to each terminal in the group via the mobility management entity (MME);

S202: the cluster server judges a state of each terminal via the MME; as regards each terminal, if it is judged that the terminal is in an idle state (RRC_IDLE), step S203 is executed, and if it is judged that the terminal is in a connection state (RRC_CONNECTED), step S204 is executed;

S203: the cluster server sends a paging message to eNBs in a tracking area list (TA list) of the terminal via the MME to notify an eNB to which the terminal belongs to upload ID information and TMGI of the terminal accessing the group call, and information about an MBSFN area allocated or pre-allocated by the MCE for the group call; and S204: the cluster server sends a dedicated control channel (DCCH) message to the eNB to which the terminal belongs via the MME to notify the eNB to upload the ID information and the TMGI of the terminal accessing the group call, and the information about the MBSFN areas allocated or pre-allocated by the MCE for the group call.

In an example embodiment, in step S203, when the MME sends the paging message to the eNBs in the tracking area list, the paging message may need extending, and the extended paging message sent by the MME to the eNBs contains the TMGI. Here, different group calls are allocated fixedly with different TMGIs so as to be easily distinguished, and each terminal stores one or more TMGIs so as to judge which group call data needs receiving. The paging frame (PF) and the paging occasion for sending the paging may be calculated according to the international mobile subscriber identity (IMSI) of the terminal, and may alternatively be calculated according to the TMGI, wherein the specific calculation method may be the manner used in the related art and will not be commented here redundantly.

Particularly, in the above-mentioned step S203, the ID information and TMGI of the terminal accessing the group call, and the information about the MBSFN areas allocated or pre-allocated by the MCE for the group call which are received by the cluster server are uploaded by the eNBs. A terminal in the idle state is taken as an example to perform below illustration of the particular process of the eNB uploading the information about the terminal accessing the group call.

The eNB sends the extended paging message to terminals in the idle state.

After receiving the extended paging message, the terminals in the idle state respectively judge whether the TMGI in the received paging message corresponds to the group call to which itself belongs; and after confirming that the TMGI corresponds to the group call to which itself belongs, some of the terminals determine to answer the group call. That is, these terminals are the terminals accessing the group call listening state, taking one terminal accessing the group call listening state as an example, this terminal initiates a radio resource control (RRC) protocol message to the eNB to which it belongs to establish a connection, and after successfully establishing the connection with the eNB to which it belongs, the terminal uploads the ID information and the TMGI thereof to the eNB.

After receiving the TMGI reported by the terminal, the eNB queries whether there is a resource configuration (i.e., the PMCH resource) corresponding to the TMGI in the MBSFN area configuration of the eNB, if not, the eNB notifies the MCE of selecting an MBSFN area for the group call, the MCE selects one MBSFN area for the group call, and returns the information about the MBSFN area selected as the information about the pre-allocated MBSFN area to the eNB; and if yes, it represents that the MCE has allocated the PMCH resource under a certain MBSFN area for the group call, and it is unnecessary to notify the MCE of allocating resources for the group call.

The eNB uploads the ID information and TMGI of the terminal accessing the group call, and information about an MBSFN area allocated or pre-allocated by the MCE for the group call to the cluster server.

In the embodiment of the disclosure, in order to facilitate counting the number of terminals under each MBSFN area, besides receiving the information about the MBSFN areas which are allocated or pre-allocated for the group call by the MCE and forwarded by the eNBs to which terminals in various listening states belong, the cluster server also receives the ID information and TMGI of respective terminals forwarded by the eNBs to which the terminals in various listening states belong.

After the above-mentioned eNBs forward all the information about the terminals accessing the group call, the cluster server receives the MBSFN areas which are allocated or pre-allocated for the group call by each MCE and reported by each eNB. When it is counted that the number of the terminals under an MBSFN area changes from zero to non-zero, the cluster server actively initiates the session start/update process of the eMBMS service via the MME. After receiving the session start/update request, the MCE allocates resources to the group call under the pre-allocated MBSFN area, that is, allocating the PMCH resources.

In an example embodiment, in the above-mentioned step S204, as regards the terminals in the connection state and accessing the group call, the eNB sends the DCCH message to the terminals in the connection state, and the other part of the process is the same as the process of the eNB uploading the information about the terminals when the terminals are in the idle state and access the group call in the above-mentioned step S203, and will not be described here redundantly.

In an example embodiment, as regards step S102, the step of the cluster server re-counting the number of the terminals under the MBSFN area allocated and pre-allocated by the MCE for the group call under three cases that a terminal delays to access the group call, a terminal in the group call listening state exits from the group call, or a terminal in the group call listening state is moving under different MBSFN areas are respectively described below.

The first case: when the terminal delays to access the group call, if the cluster server receives the information about the MBSFN area allocated or pre-allocated for the group call by the MCE which is forwarded by the eNB to which the terminal delaying to access the group call belongs, the number of terminals under the MBSFN area is increased by one.

One terminal delaying to access the group call is taken as an example to perform below illustration of the particular process of the eNB to which the terminal belongs forwarding to the cluster server the ID information, the TMGI and the information about the MBSFN area allocated by the MCE for the group call or the information about the MBSFN area pre-allocated by the MCE for the group call:

the eNB to which the terminal belongs receives the ID information and the TMGI uploaded by the terminal;

the eNB judges, according to the received ID information and TMGI which are uploaded by the terminal, whether the terminal is under the MBSFN area allocated for the group call by the MCE;

if yes, the eNB directly forwards the ID information, TMGI and information about the MBSFN area allocated by the MCE for the group call of the terminal to the cluster server, and in this case, the MBSFN area allocated by the MCE for the group call is just the MBSFN area where the terminal will receive the group call;

and if not, the eNB notifies the MCE of selecting an MBSFN area for the group call to serve as the MBSFN area pre-allocated by the MCE for the group call, and after receiving the information about the MBSFN area pre-allocated by the MCE for the group call, the eNB forwards the ID information and TMGI of the terminal to the cluster server together; and in this case, the MBSFN area allocated by the MCE for the group call is just the MBSFN area where the terminal will receive the group call.

The second case: when a terminal in the group call listening state exits from the group call, no matter the terminal is in the RRC_IDLE state previously, or in the RRC_CONNECTED state previously, upon receiving information about an MBSFN area allocated for the group call by the MCE, which is forwarded by an eNB to which the terminal exiting from the group call belongs, the cluster server decreases the number of terminals under the MBSFN area by one and in this case, the MBSFN area is the area where the terminal is to stop receiving the group call.

A terminal exiting from the group call is taken as an example to perform below illustration of the particular process of the eNB to which the terminal belongs forwarding to the cluster server the ID information, the TMGI and the information about the MBSFN area allocated by the MCE for the group call:

the terminal exiting from the group call uploads the ID information, TMGI, and information about the MBSFN area allocated by the MCE for the group call of itself;

after receiving the ID information, TMGI, and information about the MBSFN area allocated by the MCE for the group call uploaded by the terminal, the eNB forwards same to the cluster server.

The third case: when a terminal in the group call listening state is moving under different MBSFN areas, if the cluster server receives information about an MBSFN area allocated or pre-allocated for the group call by the MCE to which a target eNB belongs, which is forwarded by the target eNB of the terminal moving in different MBSFN areas, the number of terminals under the MBSFN area is increased by one, and the number of terminals under the MBSFN area allocated for the group call by the MCE to which a source eNB of the terminal belongs is decreased by one.

A terminal in the group call listening state moving under different MBSFN areas is taken as an example to perform below illustration of the particular process of the target eNB to which the terminal belongs forwarding to the cluster server the ID information, the TMGI and the information about the MBSFN area allocated or pre-allocated for the group call by the MCE to which the target eNB belongs of the terminal:

the target eNB to which the terminal belongs receives the ID information, TMGI, and information about the MBSFN area allocated by the MCE to which the source eNB belongs for the group call uploaded by the terminal;

the target eNB judges, according to the information uploaded by the terminal, whether the MBSFN configuration information of the target eNB contains the MBSFN area reported by the terminal and allocated for the group call by the MCE to which the source eNB belongs;

if yes, the target eNB does not need to upload the information to the cluster server;

and if not, the target eNB judges whether the MBSFN area and PMCH resources have been allocated for the group call in the MBSFN configuration thereof, if yes, the target eNB forwards to the cluster server the ID information, the TMGI and the information about the MBSFN area allocated for the group call by the MCE to which the target eNB belongs of the terminal; and if not, the target eNB notifies the MCE to which the target eNB belongs of selecting an MBSFN area for the group call, and after receiving the information about the MBSFN area pre-allocated for the group call by the MCE to which the target eNB belongs, the target eNB forwards the ID information and TMGI of the terminal to the cluster server together.

In the above-mentioned process, the terminal will receive the group call in the MBSFN area allocated or pre-allocated for the group call by the MCE to which the target eNB belongs, instead of receiving the group call using the MBSFN area allocated for the group call by the MCE to which the source eNB belongs. In other words, the MBSFN area allocated or pre-allocated for the group call by the MCE to which the target eNB belongs is just the MBSFN area which is used by the terminal to receive the group call after moving. The previous MBSFN area allocated for the group call by the MCE to which the source eNB belongs is just the MBSFN area where the terminal is to stop receiving the group call.

In the embodiment of the disclosure, whenever receiving various types of information of the terminals forwarded by the eNB, the cluster server updates the number of terminals under each MBSFN area in real time. If the number of terminals under the MBSFN area decreases, the ID information of the terminal under the MBSFN area is deleted, and the number of terminals under the MBSFN area is decreased by one. If the number of terminals under the MBSFN area increases, the ID information of the terminal under the MBSFN area is added, and the number of terminals under the MBSFN area is increased by one. In addition, when the number of terminals under a certain MBSFN area changes from zero to non-zero, the cluster server initiates a session start/update process, and notifies the MCE of allocating resources for the group call under the MBSFN area. When the number of terminals under a certain MBSFN area changes from non-zero to zero, to the cluster server initiates a session start/update process, and notifies the MCE of releasing the resources allocated to the group call under the MBSFN area. The difference between this session start/update progress and the session start/update progress in the related art is that the MCE directly issues the MBSFN area allocated in advance for the group call and the PMCH resources subsequently allocated for is the group call under the MBSFN area to the eNB, unlike the method in the related art that the cluster server makes the MCE to select the MBSFN area only after initiating the session start/update progress. By using the above-mentioned method, the cluster server is able to know which MBSFN areas are allocated for each group call and the number of terminals under each MBSFN area, that is, the number of terminals receiving the group call, thereby implementing update and maintenance in time.

On the basis of the same inventive idea, the embodiments of the disclosure also provide an apparatus for allocating resources for a group call in a cluster system. The principles of the apparatus solving problems are similar to those of the above-mentioned method for allocating resources for a group call in a cluster system, therefore, for the implementation of the apparatus, reference may be made to the implementation of the above-mentioned method, and repeated information is not provided herein.

Figure 3:
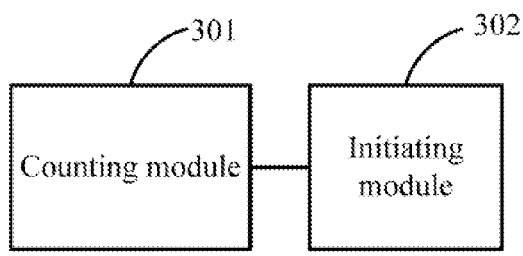
FIG. 3 is a structure diagram of an apparatus for allocating resources for a group call in a cluster system provided by an embodiment of the disclosure.

An embodiment of the disclosure provides an apparatus for allocating resources for a group call in a cluster system; as shown in FIG. 3, the apparatus particularly includes:

a counting module 301 which is configured to count, when a group call is initiated, the number of terminals under all MBSFN areas allocated and pre-allocated by each MCE for the group call, according to information about the multicast broadcast single frequency network (MBSFN) areas allocated and pre-allocated by each MCE for the group call; and to re-count, when the group call is ongoing, when a terminal delays to access the group call, a terminal in the group call listening state exits from the group call, or a terminal in the group call listening state is moving under different MBSFN areas, the number of the terminals under all the MBSFN areas allocated and pre-allocated by each MCE for the group call;

and an initiating module 302 which initiates, for each MBSFN area for which counting is performed by the counting module 301, and if it is determined that the number of the terminals under the MBSFN area changes from zero to non-zero, a process of allocating resources for the group calls under the MBSFN area; and to initiate, if it is determined that the number of the terminals under the MBSFN area changes from non-zero to zero, a process of releasing resources allocated for the group call under the MBSFN area.

In an example embodiment, the counting module 301 is specifically configured to initiate the group call to each terminal in the group via, the MME; to judge the state of the each terminal via the MME; as regards each terminal, if it is judged that the terminal is in the idle state, then the counting module 301 sends a paging message to eNBs in a tracking area list of the terminal via the MME to notify an eNB to which the terminal belongs to upload identifier (ID) information and a temporary mobile group identity (TMGI) of the terminal accessing the group call, and information about an MBSFN area allocated or pre-allocated by the MCE for the group call; and if it is judged that the terminal is in the connection state, the counting module 301 sends a dedicated control channel (DCCH) message to the eNB to which the terminal belongs via the MME to notify the eNB to upload the ID information and the TMGI of the terminal accessing the group call, and the information about the MBSFN areas allocated or pre-allocated by the MCE for the group call.

In an example embodiment, the counting module 301 is specifically configured to increase the number of terminals under the MBSFN area by one, when receiving the information about the MBSFN areas allocated or pre-allocated for the group call by the MCE, which is forwarded by an eNB to which the terminal delaying to access the group call belongs.

In an example embodiment, the counting module 301 is specifically configured to increase the number of terminals under the MBSFN area by one, when receiving information about an MBSFN area allocated for the group call by the MCE, which is forwarded by an eNB to which the terminal exiting from the group call belongs.

In an example embodiment, the counting module 301 is specifically configured to increase the number of terminals under the MBSFN area by one, when receiving the information which is about the MBSFN areas allocated or pre-allocated for the group call by the MCE and is forwarded by the target eNB of the terminal moving in different MBSFN areas; and decrease the number of terminals under the MBSFN area allocated for the group call by the MCE to which a source eNB of the terminal belongs by one.

In an example embodiment, the initiating module 302 is specifically configured to notify, by initiating the session start/update process, the MCE of allocating resources for the group call under the MBSFN area allocated for the group call by the MCE, and releasing resources allocated under the MBSFN area allocated for the group call by the MCE.

The embodiments of the disclosure provide a method and an apparatus for allocating resources for a group call in a cluster system, and during the implementation of the method, a cluster server counts the number of terminals under the MBSFN areas allocated by each MCE for the group call when the group call is initiated; and during the subsequent group call, when a terminal delays to access the group call, a terminal in the group call listening state exits from the group call, or a terminal in the group call listening state is moving under different MBSFN areas, the cluster server re-counts again the number of the terminals under all the MBSFN areas allocated and pre-allocated by each MCE for the group call; if it is determined that the number of the terminals under the MBSFN areas changes from zero to non-zero, a process of allocating resources for the group call under the MBSFN areas is initiated at this moment; and if it is determined that the number of the terminals under the MBSFN areas changes from non-zero to zero, a process of releasing resources allocated for the group call under the MBSFN areas is initiated at this moment. The embodiments of the disclosure allocate resources to the group call according to the number of the terminals receiving the group call under each MBSFN area, so as to implement update and maintenance in real time and avoid the problem of wasting resources due to the fixed configurations of the MBSFN areas receiving a group call in the related art.

Obviously, those skilled in the technical field can implement various modifications and improvements for the disclosure, without departing from the scope of the disclosure. Thus, if all the modifications and improvements belong to the scope of the claims of the disclosure and the similar technologies thereof, the disclosure is intended to contain the modifications and improvements.

What is claimed is:

1. A method for allocating resources for a group call in a cluster system, comprising:
   when the group call is initiated, a cluster server counting the number of terminals under all multicast broadcast single frequency network (MBSFN) areas allocated and pre-allocated for the group call by each multi-cell/multicast coordination entity (MCE), according to information about the MBSFN areas allocated and pre-allocated by each MCE for the group call;
   when the group call is ongoing, when a terminal delays to access the group call, a terminal in a group call listening state exits from the group call, or a terminal in the group call listening state is moving under different MBSFN areas, the cluster server re-counting the number of terminals under all the MBSFN areas allocated and pre-allocated by each MCE for the group call; and
   as regards each MBSFN area, if it is determined that the number of terminals under the MBSFN area changes from zero to non-zero, the cluster server initiating a process of allocating resources for the group call under the MBSFN area; and if it is determined that the number of terminals under the MBSFN area changes from non-zero to zero, the cluster server initiating a process of releasing resources allocated for the group call under the MBSFN area.

2. The method according to claim 1, wherein the cluster server obtains the information about the MBSFN areas allocated and pre-allocated by each MCE for the group call in the following manner:
   the cluster server initiating the group call to each terminal in a group via a mobility management entity (MME);
   the cluster server judging a state of the each terminal via the MME;
   as regards each terminal, if it is judged that the terminal is in an idle state, the cluster server sending a paging message to evolved NodeBs (eNBs) in a tracking area list of the terminal via the MME, and notifying an eNB to which the terminal belongs to upload identifier (ID) information and a temporary mobile group identity (TMGI) of the terminal accessing the group call, and information about an MBSFN area allocated or pre-allocated by the MCE for the group call; and
   if it is judged that the terminal is in a connection state, the cluster server sending a dedicated control channel (DCCH) message to the eNB to which the terminal belongs via the MME, and notifying the eNB to upload the ID information and the TMGI of the terminal accessing the group call, and the information about an MBSFN area allocated or pre-allocated by the MCE for the group call.

3. The method according to claim 1, wherein the cluster server re-counts, when the terminal delays to access the group call, the number of terminals under all the MBSFN areas allocated and pre-allocated by each MCE for the group call in the following manner:
   when the cluster server receives information about an MBSFN area allocated or pre-allocated for the group call by the MCE, which is forwarded by an eNB to which the terminal delaying to access the group call belongs, increasing the number of terminals under the MBSFN area by one.

4. The method according to claim 1, wherein the cluster server re-counts, when the terminal in the group call listening state exits from the group call, the number of the terminals under all the MBSFN areas allocated and pre-allocated by each MCE for the group call in the following manner:
   when the cluster server receives information about an MBSFN area allocated for the group call by the MCE, which is forwarded by an eNB to which the terminal exiting from the group call belongs, decreasing the number of terminals under the MBSFN area by one.

5. The method according to claim 1, wherein the cluster server re-counts, when the terminal in the group call listening state is moving under different MBSFN areas, the number of terminals under all the MBSFN areas allocated and pre-allocated by each MCE for the group call in the following manner:
   when the cluster server receives information about an MBSFN area allocated or pre-allocated for the group call by the MCE to which a target eNB belongs, which is forwarded by the target eNB of the terminal moving in different MBSFN areas, increasing the number of terminals under the MBSFN area by one, and decreasing the number of terminals under an MBSFN area allocated for the group call by the MCE to which a source eNB of the terminal belongs by one.

6. The method according to claim 1, wherein the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

7. An apparatus for allocating resources for a group call in a cluster system, wherein the apparatus comprises: a hardware processor, configured to perform program modules stored in a memory, wherein the program modules comprise:
   a counting module which is configured to count, when a group call is initiated, the number of terminals under all multicast broadcast single frequency network (MBSFN) areas allocated and pre-allocated by each multi-cell/multicast coordination entity (MCE) for the group call, according to information about the MBSFN areas allocated and pre-allocated by each MCE for the group call; and to re-count, when the group call is ongoing, when a terminal delays to access the group call, a terminal in a group call listening state exits from the group call, or a terminal in the group call listening state is moving under different MBSFN areas, the number of the terminals under all the MBSFN areas allocated and pre-allocated by each MCE for the group call;
   and an initiating module which is configured to initiate, for each MBSFN area for which counting is performed by the counting module, if it is determined that the number of the terminals under the MBSFN area changes from zero to non-zero, a process of allocating resources for the group call under the MBSFN area; and to initiate, if it is determined that the number of the terminals under the MBSFN area changes from non-zero to zero, a process of releasing resources allocated for the group call under the MBSFN area.

8. The apparatus according to claim 7, wherein the counting module is configured to initiate the group call to each terminal in the group via the mobility management entity (MME); to judge a state of the each terminal via the MME, wherein as regards each terminal, if it is judged that the terminal is in an idle state, then the counting module sends a paging message to eNBs in the tracking area list of the terminal via the MME and notifies an eNB to which the terminal belongs to upload identifier (ID) information and a temporary mobile group identity (TMGI) of the terminal accessing the group call, and information about an MBSFN area allocated or pre-allocated by the MCE for the group call; and if it is judged that the terminal is in a connection state, the counting module sends a dedicated control channel (DCCH) message to the eNB to which the terminal belongs via the MME, and notifies the eNB to upload the ID information and the TMGI of the terminal accessing the group call, and the information about an MBSFN area allocated or pre-allocated by the MCE for the group call.

9. The apparatus according to claim 7, wherein the counting module, coupled with the initiating module, is configured to increase the number of terminals under the MBSFN area by one, when receiving information about an MBSFN area allocated or pre-allocated for the group call by the MCE, which is forwarded by an eNB to which the terminal delaying to access the group call belongs.

10. The apparatus according to claim 7, wherein the counting module is configured to decrease the number of terminals under the MBSFN area by one, when receiving information about an MBSFN area allocated for the group call by the MCE, which is forwarded by an eNB to which the terminal exiting from the group call belongs.

11. The apparatus according to claim 7, wherein the counting module is configured to increase the number of terminals under the MBSFN area by one, when the cluster server receives information about an MBSFN area allocated or pre-allocated for the group call by the MCE to which a target eNB belongs, which is forwarded by the target eNB of the terminal moving in different MBSFN areas; and decrease the number of terminals under an MBSFN area allocated for the group call by the MCE to which a source eNB of the terminal belongs by one.

12. The apparatus according to claim 7, wherein the initiating module is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

13. The method according to claim 2, wherein the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

14. The method according to claim 3, wherein the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

15. The method according to claim 4, wherein the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

16. The method according to claim 5, wherein the cluster server notifies, by initiating a session start/update process of an enhanced multimedia broadcast multicast service, the MCE of allocating resources for the group call under the MBSFN area pre-allocated for the group call by the MCE, and releasing resources under the MBSFN area allocated for the group call by the MCE.

17. The apparatus according to claim 8, wherein the initiating module, coupled with the counting module, is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

18. The apparatus according to claim 9, wherein the initiating module is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

19. The apparatus according to claim 10, wherein the initiating module is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

20. The apparatus according to claim 11, wherein the initiating module is configured to notify, by initiating the session start/update process of the enhanced multimedia broadcast multicast service, the MCE of allocating resources for the group call under the MBSFN area pre-allocated for the group call by the MCE, and releasing resources under the MBSFN area allocated for the group call by the MCE.

* * * * *